Patented Jan. 28, 1941

2,229,879

UNITED STATES PATENT OFFICE 2,229,879

METHOD OF MAKING RUBBER BONDED ABRASIVE ARTICLES

Hugh V. Allison, Fairfield, Conn., assignor to The Allison Company, Bridgeport, Conn., a corporation of Connecticut No Drawing. Application December 15, 1939, Serial No. 309,397

8 Claims. (Cl. 51—293)

This invention relates to new and useful improvements in the manufacture of abrasive articles and has particular relation to an improved method of manufacturing rubber bonded abrasive articles.

An object of the invention is to provide a simple yet effective method of making rubber bonded abrasive articles.

Other objects and advantages will become apparent from a consideration of the following detailed description wherein a satisfactory embodiment of the invention is disclosed. However, it is to be understood that the invention is not limited to the details disclosed but includes all such variations and modifications as fall within the spirit of the invention and the scope of the appended claims.

Heretofore there have been three general methods of manufacturing rubber bonded abrasive articles, such methods comprising: (1) the mechanical mixing of the rubber and abrasive; (2) the so called solution method; and (3) methods involving the use of latex.

The method identified as (1) is that in which the rubber is compounded on cast iron rolls and then the abrasive mixed into the rubber by passing the rubber and abrasive between such rolls. This method involves the disadvantage of large wear on expensive machinery and the crushing of the abrasive into smaller particles whereby the sizes of the particles in the finished article cannot be accurately controlled.

According to the second identified method (this is perhaps the oldest) the rubber is dissolved by a suitable solvent to form a soft sticky mass into which the abrasive is stirred. This method has the recognized disadvantage of requiring the use of expensive solvents which must be removed before vulcanization may proceed and in the removal of which difficulty is experienced. In fact it is not always possible to completely remove the solvent and in such cases the unremoved solvent has a detrimental effect on the final product.

The third (and the most recent) method mentioned above involves the use of latex or forms of concentrated rubber dispersions derived from latex. At first latex was used only to wet or moisten the materials used in compounding the article. Later owing to difficulties encountered due to the fact that the latex was not viscous or sticky enough to hold the abrasive particles or grain in uniform suspension various thickening agents were added to the latex or the latex was coagulated. The second and third processes involve a drying operation for the production of the final articles. That is, in the third or latex process water is removed in place of the more volatile liquid of the second process.

The process of the present invention has a number of advantages over the latex processes heretofore disclosed. According to my invention steps previously thought necessary are entirely omitted and the process thus shortened. At least three advantages are present in the method of the invention and may be listed as.—(a) The coagulation of the latex to hold the abrasive grain in suspension is eliminated; (b) the step of drying or removing the solvent or water or dispersing agent is eliminated; and (c) due to the elimination of the two steps mentioned a superior product is obtained by virtue of its porosity and which porosity can be controlled.

In practicing the invention the following general method is suggested. A portion of concentrated latex, such as that commercially known as "Revertex" is thoroughly mixed with a suitable quantity of dispersed sulphur to render the material hard on vulcanization. After the mixing is completed abrasive material, as grain or particles, is stirred into the rubber suspension until the mass of abrasive is uniformly suspended throughout the mixture. At this stage the mixture is preferably of about the consistency of a paste and is placed into suitable molds and pressed to the desired density. The molds employed are of fixed capacity and thus the density of the product is controlled by varying the amount of the abrasive mixture placed in each mold. In this way a porous article may be produced.

Following the pressing of the mixture as above described the article is vulcanized in any one of the following ways: (1) by clamping the article in a suitable mold and subjecting the whole to heat; (2) by placing the article in an air bomb type of vulcanization chamber; and (3) by placing the article in super heated live steam at several atmospheres pressure.

The concentrated latex used is preferably in the nature of that sold as "Revertex" and is from 72 to 75 per cent solid matter and from 65 to 68 percent rubber. It is stabilized or protected from coagulation by a protective colloid and also by the addition of potassium hydroxide or ammonia, thus giving an alkaline reaction to the mixture.

As the concentrated latex is thus maintained acid free and alkaline it may be worked to thoroughly mix the vulcanizing agent and the abrasive particles with the latex without the likelihood of the latter coagulating before the thorough mixing is accomplished. In addition the mixture being acid free or basic vulcanization of the articles is not retarded as it is in certain previous processes wherein coagulation of the latex is effected by the addition of an acid to the mixture. In addition it is noted that a chemical coagulant has a detrimental effect in the finished product in so far as the aging of the latter is concerned.

As a specific example of the use of my method the article may be made by mixing together 143 parts by weight of the protected latex of the concentration above mentioned (as "Revertex"); 66.6 parts by weight of dispersed sulfur (the formula for which is given below) 6 parts by weight of an accelerator (the formula for which is given below) and 1200 parts by weight of No. 90 aluminum oxide abrasive material.

These materials are thoroughly mixed and in carrying out the process the mixture is placed in molds and pressed to the desired density. The blank is then removed from the mold and placed in an air bomb at eighty pounds pressure for seven hours to insure complete vulcanization of the mixture.

The vulcanizing agent or the dispersed sulfur is preferably according to the following formula:

|   | Parts by weight |
|---|---|
| Sulfur | 73 |
| Dispersing agent | 2 |
| Water | 25 |

Preferably the accelerator used is made according to the following formula:

|   | Parts by weight |
|---|---|
| Zinc oxide | 1 |
| Sulfur, dry weight | 1 |
| Butyl zimate | 1 |
| Darvan | 0.12 |
| Casein | 0.12 |
| Caustic soda | 0.1 |
| Water | 2.66 |

In making up the mixture for the molding of articles the concentrated latex and the vulcanizing and the accelerating agents are thoroughly mixed together for a short period of time. Thereafter the abrasive grain or particles are stirred into the mix and thoroughly distributed therein as by stirring the latex mixture and the abrasive together for approximately ten minutes, or if desired, for a greater period of time.

Since there are present in the latex concentrate stabilizing materials it will be clear that the mixture may be thoroughly agitated to have the abrasive uniformly distributed therein without fear of the latex setting up or coagulating. The factors covering the cutting action of the wheel or other article made from the mixture are controlled by the types and sizes of the abrasive grain used. The compactness of the wheel or other article is controlled by the size of the charge entered in a mold, the latter being of fixed capacity as above mentioned. Thus by governing the charge placed in the mold the process provides for the production of very porous cutting wheels.

In the above process it is noted that coagulation of the latex is carefully avoided. The employment of a high concentrate of latex renders the use of a coagulant unnecessary and facilitates the production of the finished articles.

The high concentrate latex results in the formation of a mixture of paste-like consistency which uniformly suspends the abrasive agent and does not allow the settling out by gravity of the abrasive from the mix. Further in the charge placed in the mold there is no acid to retard vulcanization of the articles and to detrimentally effect the aging of the ultimate product.

There being but a small quantity of water present in the mixture of concentrated latex, vulcanizing agent and accelerating agent such water as may be present in excess of that needed for the handling of the mixture to transfer it to the molds, is taken up on the abrasive grains or fillers as they are added to the mass. Thus the process of the invention in addition to avoiding the use of a coagulant also avoids the step of drying the mass and thus speeds up production of the complete articles.

It is to be understood that the invention is not limited to the use of the dispersed sulfur mentioned although it is preferred as it compounds better than the dry sulfur and thus reduces the time of mixing. In the dispersed sulfur the dispersing agent may be Darvan or any other desired agent as Vultanol, Balncol, glue or a compound comprising casein 2.5 and ammonia 2.5. Bentonite may be added to the dispersed sulfur to help stabilize it. In the accelerator mentioned above the zinc oxide serves as an activator. Also in this compound it will be appreciated that accelerating agents other than those mentioned may be used, as for example, selenium may be used as an accelerator. Casein in the compounds prevents settling out of the materials used. It will be clear that in a broad sense any convenient accelerator may be used.

A modification of the described method consists in the adding of a thickening agent to the latex. The use of the thickening agent makes for a more heavy viscous mixture in which the abrasive grain may be uniformly suspended without coagulation of the latex. The agent to be disclosed enables the user of the method to obtain the consistency desired without the step of coagulation of the latex whereby the tackiness of the mixture may be controlled and the abrasive grain uniformly suspended or distributed in the mass without the likelihood of settling out.

Thus when it is found desirable to provide a more viscous paste or dough thickening agents are added to the latex and such agents may comprise a gum as karaya gum, locust bean gum or gum tragacanth; proteins or materials derived from protein substances as gelatine, casein and glue; or starch or bentonite or alkali alginates. One or more of these agents may be made into a solution or suspension and added to the latex in the proportions to give the desired consistency. Alternatively the agents may be added to the dispersed sulfur and that mixture added to the latex. This last will give a somewhat better dispersion of the agent or agents throughout the mass of mixture.

As an example of the addition of these agents to the mixture or to the latex a solution of the karaya gum to be used may be prepared according to the following formula:

|   | Pounds |
|---|---|
| Karaya gum | 2.5 |
| Soda ash | 1.5 |
| Phenol | 0.2 |
| Water | 95.8 |

The karaya gum in powdered form is stirred into a hot solution of the other ingredients until a smooth gelatinous mass is obtained. This preparation or thickening agent is used in the proportions of approximately 3 parts of the agent to 100 parts of rubber. The karaya gum since it provides a smooth mixture of increased tackiness, whereby to hold the abrasive grain uniformly suspended in the mass, is preferred as the thickening agent.

Another solution which may be used as the thickening agent is prepared by adding 16 parts of locust bean gum to 100 parts of hot water and stirring until a smooth gelatinous mass is obtained. The thickening agent may as above suggested be added to the latex or to the dispersed sulfur and if to the latex either before or after the sulfur dispersion has been added thereto. In each case after the desired viscosity is obtained the abrasive grain is stirred into the mix.

Having thus set forth the nature of my invention, what I claim is:

1. The method of making an abrasive article comprising rendering rubber latex stable to avoid coagulation thereof, using a latex of approximately 65 percent rubber content adding a thickening agent to increase the consistency and tackiness of the mixture whereby to have the same uniformly support abrasive grain therein, mixing abrasive grain and a vulcanizing agent in the mass until the grain and vulcanizing agent are uniformly distributed therein, shaping articles directly from said mass, and vulcanizing such shaped articles in the presence of a gas under pressure.

2. The method of making abrasive articles comprising adding a thickening agent comprising a gum to a rubber latex of approximately 65 percent rubber content to increase the consistency and tackiness thereof to the point where it will support abrasive grain in uniform suspension, mixing abrasive grain and a vulcanizing agent with said mass and shaping and vulcanizing articles from said mass in the presence of a gas under pressure.

3. The method of making abrasive articles comprising adding a thickening agent comprising karaya gum to a rubber latex to increase the consistency and tackiness thereof to the point where it will support in uniform suspension an abrasive grain, mixing abrasive grain and a vulcanizing agent with said mass and shaping and vulcanizing articles from the mass.

4. The method of making abrasive articles comprising adding karaya gum to a sulfur dispersion, stirring said mixture into a rubber latex together with abrasive grain until the same is uniformly mixed and of a consistency and tackiness to support in suspension said abrasive grain, and shaping and vulcanizing articles from said mixture.

5. The method of making an abrasive article comprising mixing a vulcanizing agent, latex and abrasive grain, rendering said latex stable to avoid coagulation thereof, using a latex having a rubber content of approximately 65 per cent whereby said mixture is of paste-like consistency, and shaping articles in a mold directly from said mixture and vulcanizing said shaped articles in an atmosphere of super heated steam and driving the moisture from the mixture during such vulcanization of the article whereby a porous article is produced.

6. The method of making an abrasive article comprising mixing a vulcanizing agent, latex and abrasive grain, stabilizing the latex to avoid coagulation thereof, using a latex concentrate having a rubber content of approximately 65 per cent whereby said mixture is of paste-like consistency, and shaping articles in a mold directly from said mixture and vulcanizing such articles in the presence of air under pressure.

7. The method of making a very porous abrasive article comprising rendering a concentrated latex stable to prevent coagulation thereof, mixing a vulcanizing agent into the latex, adding abrasive grain to said mixture until it is characterized by the absence of excessive water, shaping articles directly from said mixture in a fixed capacity mold and vulcanizing the articles while in said mold whereby the water in the mixture is all driven off only during vulcanization in such fixed capacity mold and a very porous abrasive article results.

8. The method of making an abrasive article comprising mixing a vulcanizing agent, latex and abrasive grain, incorporating in said latex an agent to render the same stable and prevent coagulation thereof, using a latex of approximately 65 percent rubber content, shaping said article in a mold directly from said mixture without removing any moisture therefrom, and then vulcanizing said article under pressure and driving the moisture therefrom during vulcanization thereof whereby said article is very porous.

HUGH V. ALLISON.